United States Patent [19]

Jouppi

[11] Patent Number: 5,261,113
[45] Date of Patent: Nov. 9, 1993

[54] APPARATUS AND METHOD FOR SINGLE OPERAND REGISTER ARRAY FOR VECTOR AND SCALAR DATA PROCESSING OPERATIONS

[75] Inventor: Norman P. Jouppi, Palo Alto, Calif.

[73] Assignee: Digital Equipment Corporation, Maynard, Mass.

[21] Appl. No.: 581,419

[22] Filed: Sep. 11, 1990

Related U.S. Application Data

[63] Continuation of Ser. No. 147,754, Jan. 25, 1988, abandoned.

[51] Int. Cl.⁵ .................................. G06F 9/38
[52] U.S. Cl. .................... 395/800; 364/DIG. 1; 364/231.8; 364/232.21; 364/262.4; 364/262; 395/375
[58] Field of Search ............ 395/800, 775, 375

[56] References Cited

U.S. PATENT DOCUMENTS

| | | | |
|---|---|---|---|
| 3,794,984 | 2/1974 | Deerfield et al. | 364/200 |
| 4,037,213 | 7/1977 | Atkins et al. | 364/200 |
| 4,128,880 | 12/1978 | Cray, Jr. | 364/200 |
| 4,302,818 | 11/1981 | Niemann | 364/200 |
| 4,306,287 | 12/1981 | Huang | 364/200 |
| 4,449,184 | 5/1984 | Pohlman, III et al. | 364/200 |
| 4,463,441 | 7/1984 | Kassabou et al. | 364/900 |
| 4,463,796 | 6/1985 | Omoda et al. | 364/200 |
| 4,541,046 | 9/1985 | Nagashima et al. | 364/200 |
| 4,594,682 | 6/1986 | Drimak | 364/200 |
| 4,636,942 | 1/1987 | Chen et al. | 364/200 |
| 4,641,275 | 2/1987 | Hatakeyama et al. | 364/900 |
| 4,661,900 | 4/1987 | Chen et al. | 364/200 |
| 4,760,518 | 7/1988 | Potash et al. | 364/200 |
| 4,760,525 | 7/1988 | Webb | 364/200 |
| 4,779,192 | 10/1988 | Torii et al. | 364/200 |
| 4,780,811 | 10/1988 | Aoyama et al. | 364/200 |
| 4,837,730 | 6/1989 | Cook et al. | 395/800 |
| 4,875,161 | 10/1989 | Lahti | 395/425 |
| 4,888,679 | 12/1989 | Fossum et al. | 395/800 |

*Primary Examiner*—Kevin A. Kriess
*Attorney, Agent, or Firm*—Kenneth F. Kozik; Denis G. Maloney; Barry N. Young

[57] ABSTRACT

In a data processing system in which a processing unit can execute both scalar and vector instructions, the use of a single operand register file to store both the scalar operation operands and the vector operation operands is described. An instruction is included in the instruction repertoire in which a field is decremented (until a zero field is reached) to provide the next sequential operand address and to indicate that the prior operation is to be repeated on the next sequential operand.

16 Claims, 4 Drawing Sheets

APPARATUS AND METHOD FOR SINGLE OPERAND REGISTER ARRAY FOR VECTOR AND SCALAR DATA PROCESSING OPERATIONS

This is a continuation of copending application Ser. No. 07/147,754, filed on Jan. 25, 1988, now abandoned.

BACKGROUND OF THE INVENTION

1. Field of the Invention

This invention relates generally to data processing systems and, more particularly, to data processing systems capable of performing scalar and vector operations 2. Description of the Related Art In order to increase the performance of certain types of repetitious operations, the technique of vector data processing operations has been developed. For example, a vector add operation can be used to add the corresponding elements of two data arrays (generally referred to as vector arrays) together and store the resultant sums in a third data array. This operand processing procedure can be contrasted with scalar instructions implementing the same computation which would require repeated execution of a loop routine. Vector processing has the advantage of specifying, in a single instruction, the processing of large amounts of data without the need to issue multiple instructions or perform loop iteration control. In addition, since the same operation is being applied to each set of operands, pipelining techniques can be efficiently employed to increase performance. In general, two models of vector array processing have emerged, the register based model and the memory based model.

In the resister based model, sets of operands are transferred (loaded) from main memory and stored in special registers referred to as vector registers. Each vector register can store a multiplicity of operands, each set of operands having a predetermined length. When one or more vector registers have the required operands stored therein, then all the operands stored in the vector register are processed by a common arithmetic operation and the operands resulting from the processing operation are stored in target vector register locations. Because the same operation is performed on all the operands of the vector register, only one instruction need be issued to the processing execution unit to manipulate a multiplicity of operands. After all the requisite operations are performed on the set of operands, the operands are returned to (or stored in) the main memory unit.

In the memory based model, the operands are transferred directly from the main memory unit to the execution unit and the resulting operands are returned directly to the main memory unit.

When intermediate results are present in a computation (which is often the case), the memory-based model must store the intermediate results in memory and fetch them again for each successive use. When a vector memory fetch operation is started, a certain amount of time is required before the first operand arrives from memory. Also, as ports to the main memory unit are expensive and hence limited in number, the presence of vector memory operations in progress may further delay the arrival of the first operand from memory.

The register-based model, however, does not incur the penalty of repeatedly storing and fetching intermediate results because they are available without memory latency when they are present in a vector register. Thus, the register-based model results in higher performance, in general, unless the vectors are of sufficient length that the long start-up period resulting from the memory latency is negligible compared to the length of the vector array. Because the register-based model is effective for short as well as long vectors, it has become more widely used than the memory-based model.

One difficulty with prior art register-based models is that the elements of vector operands and scalar operands are stored in different register sets and different instructions are needed to operate on the different register sets. Furthermore, scalar operations can not be applied to a single operand (i.e., element) in a vector register. Instead all the operands in the vector register must be stored into the main memory unit from the vector register and the desired single operand fetched into a scalar register. If further vector processing involving this single operand is required, it must be stored and all the elements of the vector operand must be fetched into the vector register. As a practical matter, many computations involve mixed scalar and vector operations on operands, so the distinction between elements in vector operands and scalar operands requires costly memory operations.

A need has therefore been felt for an operand processing technique which eliminates the distinction between operands in vector registers and operands in scalar registers, and the attendant limitations on the operations thereon. This technique further reduces overhead of storing and fetching operands between computations.

FEATURES OF THE INVENTION

It is an object of the present invention to provide an improved data processing system.

It is a feature of the present invention to provide a data processing unit capable of performing scalar and vector data processing operations.

It is yet another feature of the present invention to provide a common register file for operands used in both scalar and vector data processing operations.

It is still another feature of the present invention to provide an instruction for a data processing unit that results in the same operation being executed for a sequence of operands stored in a register file.

It is yet another feature of the present invention to provide an improved technique for performing processing operations that require both vector and scalar operations.

SUMMARY OF THE INVENTION

The aforementioned and other features are attained, according to the present invention, by providing, in a data processing system, a processing unit capable of performing scalar and vector operations. The operands for the data processing unit for both the scalar and vector operations, are stored in a single operand register file. The processing unit is responsive to instructions that contain a field incremented after the initiation of an instruction and that permits sequential operand register file locations to be addressed while performing the same processing operation on the sequence of addressed operands.

These and other features of the present invention will be understood upon reading of the following description along with the drawings.

DESCRIPTION OF THE PREFERRED EMBODIMENT

1. Detailed Description of the Figures

Figure 1:
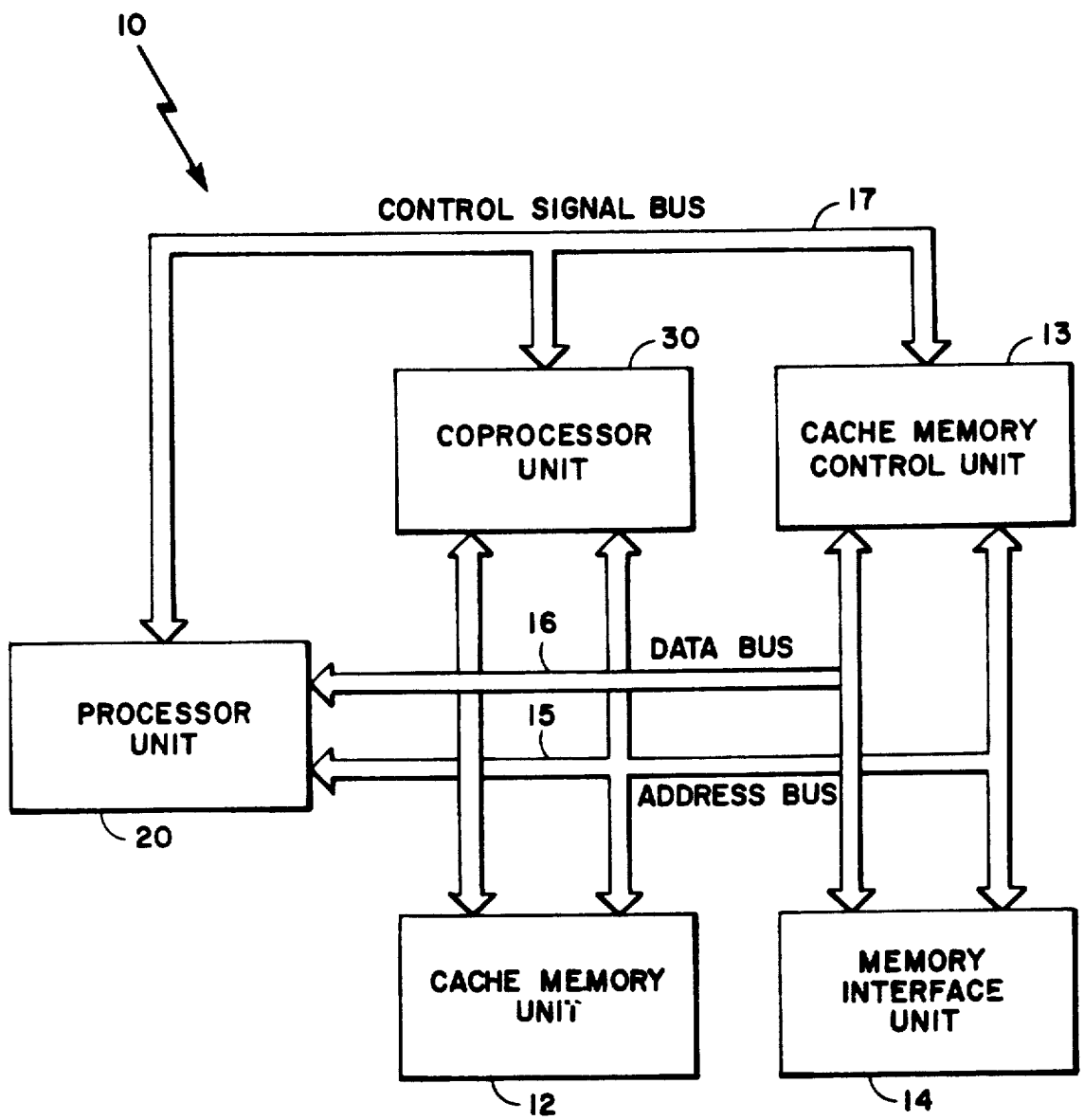
FIG. 1 is a block diagram of the data processing system of the preferred embodiment.

Referring first to FIG. 1, a block diagram of a central processing unit 10 capable of advantageous use of the present invention is illustrated. The processor unit 20 performs typical processing operations on data signal groups under control of instruction signal groups, the typical operations capable of being performed within the time constraints of a pipeline implementation. The coprocessor unit 30 performs special processing operations on data signal groups under control of instruction signal groups, the special operations including data processing operations that can not be accommodated within the time constraints of the processor unit 20 pipeline implementation. In addition, the coprocessor units performs vector operations. The cache memory unit 12 stores the data signal groups and the instruction signal groups for which a central processing unit 10, executing a program or a procedure, can have the most immediate requirement. The cache memory control unit 13 controls the operation of the cache memory unit 12. The memory interface unit 14 provides the apparatus permitting the central processing unit 10 to exchange signal groups with other processors, the main memory unit, and with the input/output devices, not shown. The processor unit 20, the coprocessor unit 30, the cache memory unit 12, the cache memory control unit 13 and the memory interface unit 14 are coupled by an address signal group bus 15 and a data signal group bus 16. In the preferred embodiment, the address signal group bus 15 can exchange 32 bit signal groups between the components of central processing unit 10, and the data signal group 16 bus can exchange 32 or 64 bit signal groups of components of the central processing unit 10. The processor unit 20, the coprocessor unit 30 and the cache memory control unit 13 are coupled by a control signal bus 17 by which control signals can be exchanged between the units.

Figure 2:
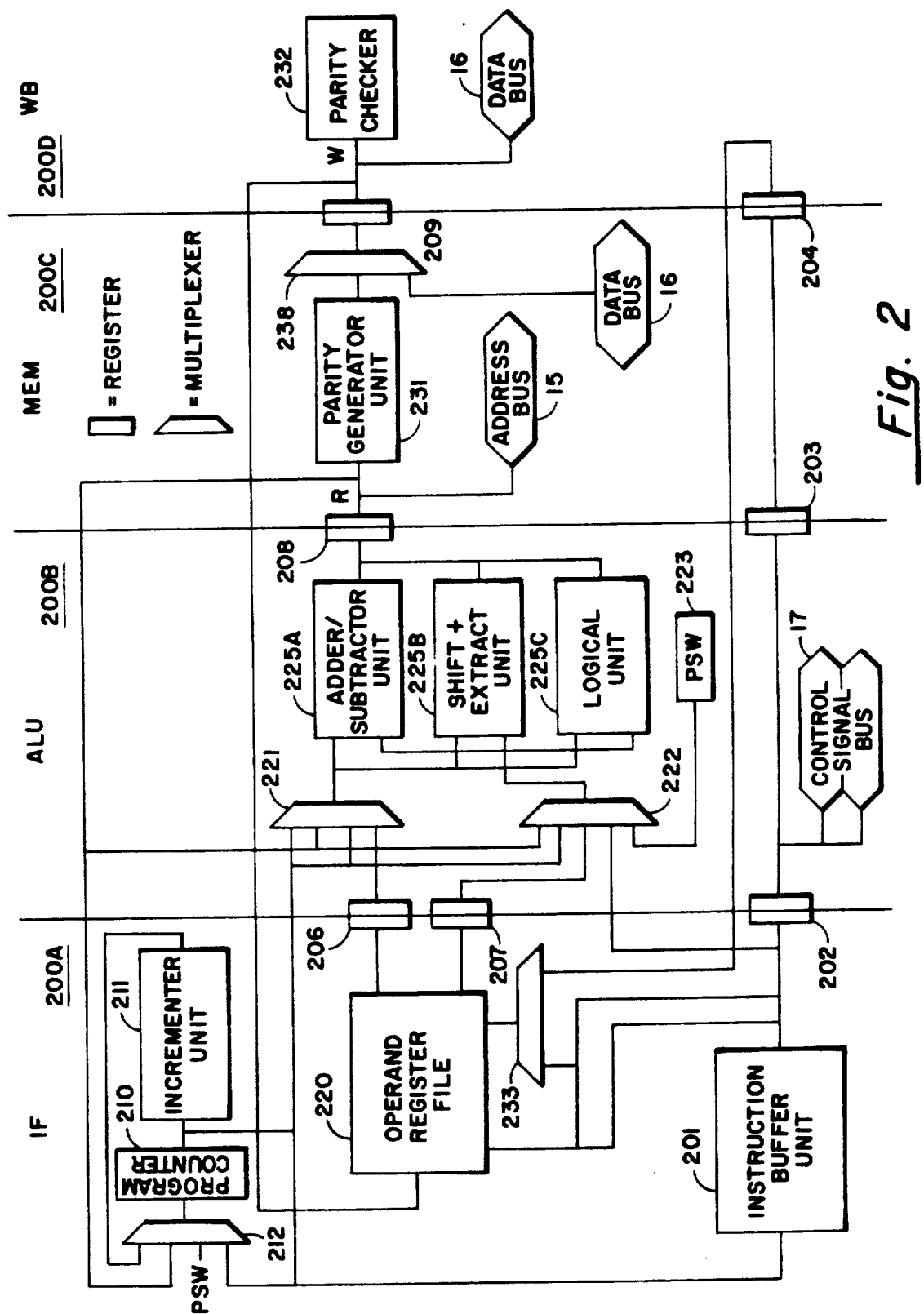
FIG. 2 is a block diagram of a pipelined central processing unit capable of using the present invention.

Referring next to FIG. 2, a block diagram of pipelined processor unit 20 of a central processing unit 10 is illustrated. The first pipeline stage of the processor unit 20 is the instruction fetch stage 200A. The second pipeline stage of the processor unit 20 is the arithmetic logic unit stage 200B, while the third pipeline stage is the memory stage 200C and the fourth pipeline stage is the write back stage 200D. The instruction buffer unit 201 applies signals to instruction register 202. Instruction register 202 controls the operation of the arithmetic logic unit stage 200B (by control apparatus not shown) and applies control signals to instruction register 203 and to control signal bus 17. Instruction register 203 controls the operation of the memory stage 200C and applies control signals to instruction register 204. Instruction register 204 controls the operation of the write back stage 200D and applies signals to multiplexer unit 233. Instruction buffer unit 201 also applies signals to operand register file 220, multiplexer unit 233 and to multiplexer unit 222. Multiplexer unit 233 applies signals to operand register file 220. Operand register 206 and operand register 207 temporarily store operands being transferred from operand register file 220 to the arithmetic logic unit stage 200B. Operand register 208 temporarily stores operands being transferred from the arithmetic logic unit stage 200B to the memory stage 200C and operand register 209 stores signals that are to be written back into operand register file 220, that are to be applied to parity checker 232, and that are to be applied to data bus 16. In the instruction fetch stage 200A, program counter 210 applies signals to instruction buffer unit 201 and to incrementer unit 211. Multiplexer unit 212 receives signals from the program counter 210, from the incrementer 211, from operand register 208 and from the program status word register 223. In the arithmetic logic unit stage 200B, multiplexers 221 and 222 receive signals from operand register 208 and from operand register 209. Multiplexer unit 221 receives signals from program counter 210 and from operand register 206, while multiplexer unit 222 receives signals from operand register 207, from instruction buffer 201 and from the program status word register 223. The multiplexer units 221 and 222 apply signals to execution apparatus of the arithmetic logic unit stage 200B including adder/subtracter unit 225A, shift & extract unit 225B and logical unit 225C, while the output signals from the execution apparatus are applied to the operand register 208. In the memory stage 200C, signals from operand register 208 can be applied to address bus 15 or to parity generator unit 231. Multiplexer unit 238 receives signals from the parity generator unit and from the data bus 16 and applies signals to the operand register 209.

Figure 3:
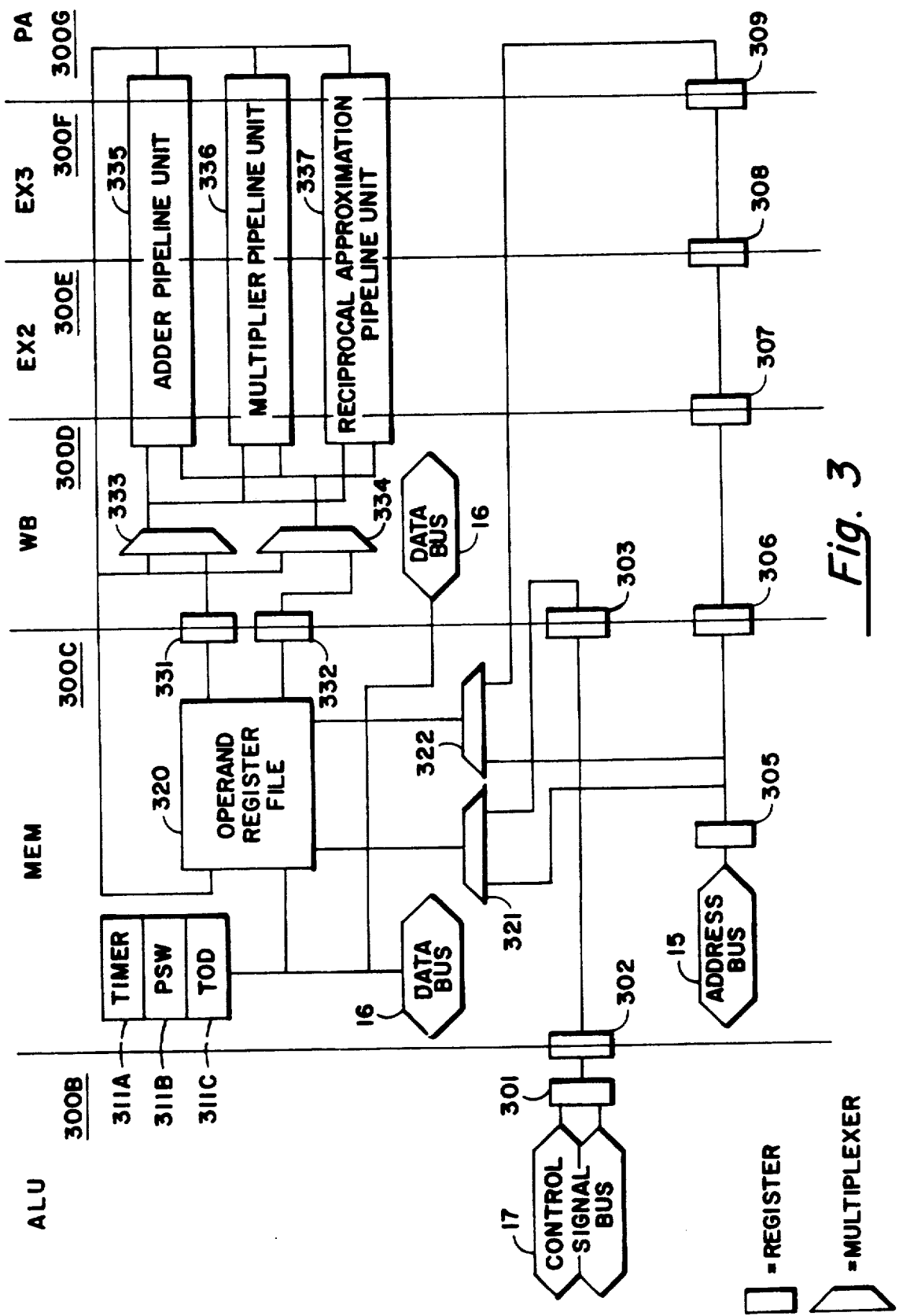
FIG. 3 is a block diagram of a pipelined coprocessor unit capable of using the present invention.

Referring next to FIG. 3, a block diagram of the coprocessor unit 30, also implemented using pipeline techniques, is shown. The stages of the coprocessor unit 30 that are synchronized with the processor unit 20 stages and stages operating on coincident clock cycles are similarly designated in FIG. 2 and FIG. 3. Because of this similar designation, coprocessor arithmetic logic unit stage 300B, memory stage 300C and write back stage 300D have different functions than the names would imply. In the arithmetic logic unit stage 300B, signals from the control signal bus 17 are applied through instruction register 301 to instruction register 302. Instruction register 302 transfers control signals to instruction register 303 during memory stage 300C. During memory stage 300C, signals from the address bus 15 are applied to instruction register 305 and transferred to instruction register 306. During the write back stage 300D, the contents of instruction register 306 are transferred to instruction register 307. During the execution 2 stage, the contents of instruction register 307 are transferred to instruction register 308. During execution 3 stage 300F, the contents of instruction register 308 are transferred to instruction register 309. Signals from the timer unit 311A, the program status register 311B, the time of day clock unit 311C and signals from data bus 16 are applied to the data signal group bus. Signals from instruction register 305 are applied to multiplexer unit 321 and multiplexer unit 322. Multiplexer units 321 and 322 also receive signal from instruction register 303 and apply signals to operand register file 320. Signals from operand register file 320 are applied to operand registers 331 and 332. Multiplexer unit 333 receives signals from operand register 333, adder pipeline unit 335, multiplier pipeline unit 336 and reciprocal approximation pipeline unit 337, while multiplexer unit 333 applies signals to adder pipeline unit 335, multiplier pipeline unit 336 and reciprocal approximation pipeline unit 337. The multiplexer unit 334 receives signals from operand register 332, from adder pipeline unit 335, from multiplier pipeline unit 336 and from reciprocal approximation pipeline unit 337 and applies signals to adder pipeline unit 335, multiplier pipeline unit 336 and reciprocal approximation pipeline unit 337. Adder pipeline unit 335, multiplier pipeline unit 336 and reciprocal approximation pipeline unit 337 are applied to the operand register file 320.

Figure 4:
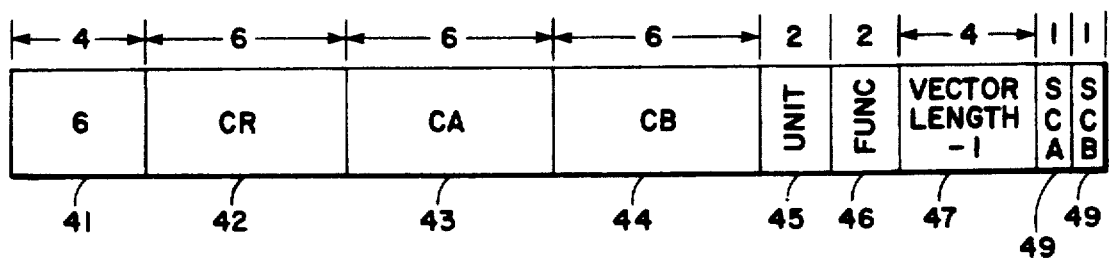
FIG. 4 illustrates the structure of a vector instruction according to the present invention.

Referring next to FIG. 4, the format of the vector operation instruction according to the present invention is illustrated. Field 41 identifies that this logic signal group is a vector operation execution instruction. Field 42 identifies the destination location in the operand register file 320, while field 43 and field 44 are the operand register file 320 locations for the source operands, i.e., the operands to be processed by the coprocessor unit 30. Field 45 designates the execution unit (335, 336 or 337) performing the operation on the source operands. Field 46 identifies the function performed by the selected execution unit. Field 47 identifies the vector length, i.e., the number of times that the identified operation is repeated. Field 48 indicates that the operand in the register file location of field 43 is a scalar quantity and the address of the file location should not be incremented. Field 49 indicates that the operand in the register file location of field 44 is a scalar quantity and the address of the file location should not be incremented.

2. Operation of the Preferred Embodiment

The coprocessor unit does not have separate scalar operand and vector operand register files, but rather provides a combined operand register file. In addition, the preferred embodiment does not provide for a vector register load and store instructions. The vector instruction permits operands in a sequence of storage locations to be manipulated without interruption. While this processing is being performed, the processing unit retrieves data for future processing, can store previous results and can execute loop overhead instructions. The vector instruction of the present invention provides a field that indicates when the address field is to be incremented (or decremented) and indicates when the series of processing operations being performed by the vector instruction is complete by decrementing the field value and continuing processing for a non-zero field. A scalar operation can be considered a vector operation with a vector length of one and a field length of zero. In the preferred embodiment, the compiler assigns the locations in the operand register file, every location on the operand register file being capable of storing vector operands or scalar operands. This assignment may change as the program progresses.

Mixed scalar and vector operations are possible by use of the sca field 48 and the scb field 49. If the sca field is one, but the scb field is zero, then "Vector < = scalar < operation > vector" is performed. Similarly if the sca field is zero and the scb field is one, "Vector < = vector < operation > scalar" is performed. These are useful when the same operation and value are to be applied to all the operands of a vector. If the sca field and the scb field are both one, "Vector < = scalar < operation > scalar" is performed. This is useful for initializing all the operands of a vector to the same value.

The ability to operate on operands in a common register file as either scalar or vector operand elements simplifies mixed operations, eliminates stores and fetches between vector and scalar units, provides flexibility to implement operations not possible in a separated implementation, therefor resulting in higher computation performance. Reduction and recurrence operations are two examples of operations difficult to implement in prior art vector register implementations. A reduction operator reduces all operands down to a scalar operation, such as summing all the elements of a vector. A recurrence operation contains a data dependency between previous operands in a vector array and the operand being computed, such as each result element is the sum of the previous two elements in the vector.

Reduction operations are common in many problems, such as matrix multiply operations. In the matrix multiply procedure, each pair of row and column (vector) operands must be multiplied and the elements of the resulting vector operand summed as scalars. In the prior art, unless special complex vector sequencing hardware is provided, a time consuming transfer operation is required to move the resulting (vector) operands from the vector register file to the scalar operand register file.

Recurrence operations are precluded in the prior art. These prior implementations assume that vector operands are independent of data dependencies within each other, and only one means is provided to index into a vector register. Thus operations such as "V[i] < −V[i−1] operation V[i−2]", where an element of a vector is computed to be the specified operation applied to the previous two elements of a vector, are not possible because the operation requires three different indicies to specify each vector operand. This operation is possible in the common register file because the scalar data dependency operation issue control is used for vector operations as well, and individual vector elements are independently accessible, just as are scalar operands. Note that although this recurrence will be computed at one third the rate of normal vector operations (because of the data dependency and the latency of the functional units is three), this processing procedure is still much faster than performing this computation in the scalar unit with a loop routine.

Although the foregoing discussion describes the use of a register file that can be used for scalar and vector operations performed by a coprocessor unit, it will be clear that the technique can be applied to any processing unit capable of performing requisite operations for both scalar and vector operations. Furthermore, in the preferred embodiment described heretofore, the (coprocessor) processing unit was implemented with a pipeline structure that permits all processing operations to be implemented in an equal period of time, this implementation is not a requirement for the processing unit.

As indicated in FIG. 3, the execution units, i.e., the adder pipeline unit 335, the multiplier pipeline unit 336 and the reciprocal approximation pipeline 337, are implemented to require the same number of periods for execution of data processing operations. This implementation, simplifies the synchronization between the processor unit 20 and the coprocessor unit 30.

In addition to providing given time period for all the execution subunits of the coprocessor unit, these execution units are implemented to require a small number of clock cycles (3) to perform the instruction execution, i.e., a small latency. The small latency of the execution subunits implies that vectors having a correspondingly small vector array length can be efficiently manipulated. (Vector operand registers become efficient when the vector length is at least the latency of the execution units.) As will be clear to those skilled in the art, the scatter/gather operation, a complicated procedural facility in current vector processing units useful in processing sparse vector operands, can be easily implemented with a combined vector/scalar register file when loads and stores to the operand register file are performed as scalar operations concurrent with vector operand processing.

As will be clear to those skilled in the art, apparatus associated with the coprocessor unit has not been illustrated. This apparatus permits the coprocessor unit to execute vector instructions without continuing intervention by processor unit. For example, apparatus to increment the operand file address field is not shown.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A central processing unit for performing scalar and vector data processing operations, said central processing unit comprising:

an execution portion capable of performing vector processing operations and scalar processing operations in response to instructions having a format with a field of data bits to identify said vector processing operations and said scalar processing operations;

means, responsive to a plurality of executing instructions, for providing control signals determined by said instructions; and operand register file means, responsive to control signals from said control signal means, for applying a first sequence and a second sequence of operands identified by one of said plurality of executing instructions to said execution portion, with said first and said second sequence of operands being stored in said operand register file means and with at least a first one of said first and second sequences of operands stored in said register file means having an operand corresponding to a scalar data processing operation and with at least a second one of said first and second sequences of operands having an operand corresponding to a vector data processing operation; and with said one of said plurality of said executing instructions causing processing operations identified by said one of said plurality of said executing instructions to be performed by said execution portion.

2. The central processing unit for performing vector and scalar data processing operations of claim 1 further comprising:

a processing unit comprising a first plurality of pipelined stages wherein said plurality of pipelined stages of said processing unit each perform an operation each clock period, with said processing unit including said means for providing control signals; and a coprocessing unit responsive to control signals from said means for providing control signals, said coprocessor unit comprising a second plurality of pipelined stages, said stages of said coprocessor unit being synchronized with stages of said processing unit, said coprocessing unit performing operations requiring an execution portion longer than said clock period, with said coprocessor unit further including said execution portion and said operand register file means, said processing unit providing operand register file addresses identified by fields of said executing instruction.

3. The central processing unit for performing vector and scalar data processing operations of claim 1 further comprising:

a processing unit, said processing units including said means for providing control signals; and a coprocessor unit responsive to control signals from said means for providing control signals, with said coprocessor unit further including said execution portion and said operand register file means and said processing unit providing operand register file addresses identified by fields of said executing instruction.

4. The central processing unit for performing vector and scalar data processing operations of claim 1 wherein load and store instructions for entering data signal groups in said operand file register identify one data signal group.

5. The central processing unit for performing vector and scalar data processing operations of claim 1 wherein said instructions include a first and a second operand address fields and a third resultant operand address field, said instructions further including a third field indicating when this is a vector operation and fourth field indicating the vector length.

6. The central processing unit for performing vector and scalar data processing operations of claim 2 wherein said coprocessor unit includes a plurality of instruction registers for controlling operation of a coprocessor unit stage coupled to each of said instruction registers, wherein signal groups stored in said each instruction register are determined by said means for providing control signals.

7. The central processing unit of claim 1 wherein said instruction include:

a first and a second field identifying locations storing operands in said operand register file means to be processed;

a third operand field identifying a location in said operand file means into which a resulting operand is to be stored;

a fourth operand field identifying an instruction as a second instruction type; and a fifth operand field identifying a number of members in an operand vector.

8. The central processing unit of claim 2 wherein said processor unit and said coprocessor unit are implemented using pipeline techniques, wherein each stage of said pipelined processor and coprocessor units have at least one instruction register associated therewith, said instruction registers controlling operation of said associated processor and coprocessor unit stages, said instruction registers receiving signals from said instruction means.

9. The central processing unit of claim 8 wherein said processor unit includes:

a second operand register file;

storage and retrieval means for storing an operand in and retrieving an operand from said operand register file or for storing an operand in and retrieving an operand from said second operand register file in response to predetermined instructions; and incrementing means for incrementing at least one address for said second operand register file.

10. The central processing unit of claim 9 wherein said coprocessor unit includes a plurality of pipelined execution subunits, each of said execution subunits implemented to require an equal period of time to complete suboperations executed therein.

11. The central processing unit of claim 7 wherein said instructions further include:

a sixth operand field indicating when said first operand field can be changed.

12. A method for performing vector and scalar data processing operations in a central processing unit, said method comprising the steps of:

storing data signal groups to be processed in an operand register file;

processing said data signal groups in accordance with instructions stored in said central processing unit comprising the steps of;

processing a first and second data signal group stored in said operand register file and identified by a first instruction format with an operation identified by said first instruction format; and processing a plurality of data signal groups stored in said operand register file and having locations in said operand register file identified by a second different instruction format with an operation identified by said second second instruction format.

13. The method for performing vector and scalar data processing operations in a central processing unit of claim 12 wherein said central processing unit is divided into a processor unit implemented using pipeline techniques and a coprocessor unit using pipeline techniques, wherein said operand register file is included in said coprocessor unit, said method further comprising the steps of:

decoding said instructions in said processor unit; and processing said operands in said register file in said coprocessor unit according to said instructions.

14. The method for performing vector and scalar data processing operations in a central processing unit of claim 13 further comprising the step of storing a data signal group into or retrieving data signal group from a single location in said operand register file in response to each storing or retrieving instruction for said operand register file.

15. The method for performing vector and scalar data processing operations in a central processing unit of claim 14 further comprising the step of providing control signals controlling operations of said coprocessor unit from an instruction decoder unit in said processor unit.

16. The method for performing vector and scalar data processing operations in a central processing unit of claim 7 wherein said instructions comprise:

first, second, and third fields identifying locations of respectively a first sequence of operands, a second sequence of operands, and a location into which a resultant operand is to be stored;

a fourth field identifying when said instruction having said fourth field is a vector instruction; and a fifth field identifying a number of operands in at least one of said first and said second sequence of operands, wherein said first and said second sequence have at least one operand.

* * * * *